(12) United States Patent
Glovier et al.

(10) Patent No.: US 12,082,517 B2
(45) Date of Patent: Sep. 10, 2024

(54) SYSTEM AND METHOD FOR DETECTING MATERIAL ACCUMULATION RELATIVE TO ROTATING GROUND-ENGAGING TOOLS OF AN AGRICULTURAL IMPLEMENT

(71) Applicant: CNH Industrial America LLC, New Holland, PA (US)

(72) Inventors: Scott Glovier, Lombard, IL (US); Michael R. Cozza, Pittsburgh, PA (US); Heather Humphreys Paxinos, Burr Ridge, IL (US); Jian Jiao, Hinsdale, IL (US)

(73) Assignee: CNH Industrial America LLC, New Holland, PA (US)

( * ) Notice: Subject to any disclaimer, the term of this patent is extended or adjusted under 35 U.S.C. 154(b) by 587 days.

(21) Appl. No.: 17/238,883

(22) Filed: Apr. 23, 2021

(65) Prior Publication Data

US 2022/0338406 A1     Oct. 27, 2022

(51) Int. Cl.
*A01B 63/00* (2006.01)
*A01B 63/114* (2006.01)
(Continued)

(52) U.S. Cl.
CPC .......... *A01B 79/005* (2013.01); *A01B 63/008* (2013.01); *A01B 63/114* (2013.01); *A01B 49/027* (2013.01)

(58) Field of Classification Search
None
See application file for complete search history.

(56) References Cited

U.S. PATENT DOCUMENTS 4,537,262 A * 8/1985 van der Lely ....... A01B 49/027
172/151
5,632,343 A * 5/1997 Gengler ................. A01B 27/00
172/552

(Continued)

FOREIGN PATENT DOCUMENTS

DE     102017112224 A1     12/2018
WO     WO 2019/102496     5/2019

*Primary Examiner* — James M McPherson
(74) *Attorney, Agent, or Firm* — Rebecca Henkel; Peter K. Zacharias; Rickard K. DeMille

(57) ABSTRACT

A system for detecting material accumulation relative to rotating ground-engaging tools includes an agricultural implement having a frame and first and second ground-engaging tools supported relative to the frame, with the first ground-engaging tool corresponding to a different tool type than the second ground-engaging tool. The system also includes first and second speed sensor configured to provide data indicative of the rotational speeds of the first and second ground-engaging tools, respectively. In addition, the system includes a computing system communicatively coupled to the first and second speed sensors. The computing system is configured to monitor the rotational speeds of the ground-engaging tools based on the data provided by the speed sensors, determine a speed correlation between the rotational speed of the first ground-engaging tool and the rotational speed of the second ground-engaging tool, and determine when the speed correlation differs from a speed correlation threshold associated with the ground-engaging tools.

20 Claims, 7 Drawing Sheets

(51) Int. Cl.
 *A01B 79/00* (2006.01)
 *A01B 49/02* (2006.01)

(56) References Cited

U.S. PATENT DOCUMENTS

| | | |
|---|---|---|
| 6,070,539 A | 6/2000 | Flamme et al. |
| 8,408,149 B2 | 4/2013 | Rylander |
| 9,485,900 B2 | 11/2016 | Connell et al. |
| 10,392,016 B2 | 8/2019 | Gorczowski |
| 10,492,353 B2 | 12/2019 | Kovach et al. |
| 2016/0088787 A1* | 3/2016 | Connell ................. A01B 76/00 701/33.9 |
| 2019/0239413 A1* | 8/2019 | DeGarmo ............... A01B 21/08 |
| 2020/0107494 A1 | 4/2020 | Schoeny et al. |
| 2020/0107498 A1 | 4/2020 | Anderson et al. |

* cited by examiner

SYSTEM AND METHOD FOR DETECTING MATERIAL ACCUMULATION RELATIVE TO ROTATING GROUND-ENGAGING TOOLS OF AN AGRICULTURAL IMPLEMENT

FIELD OF THE INVENTION

The present disclosure generally relates to agricultural implements and, more particularly, to systems and methods for detecting material accumulation relative to rotating ground-engaging tools of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more tools configured to engage the soil as the implement is moved across the field. For example, in certain configurations, the implement may include one or more harrow disks, leveling disks, rolling baskets, shanks, tines, and/or the like. Such tools loosen and/or otherwise agitate the soil to prepare the field for subsequent planting operations.

During tillage operations, field materials, such as residue, soil, rocks, and/or the like, may become trapped or otherwise accumulate between adjacent tools. Such accumulations of field materials may inhibit the operation of the tools in a manner that prevents the tools from providing adequate tillage to the field. In such instances, it is necessary for the operator to take certain corrective actions to remove the material accumulation. However, it may be difficult for the tillage implement operator to determine when material accumulation occurs between the tools.

Accordingly, a system and related method for detecting material accumulation relative to tools of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting material accumulation relative to rotating ground-engaging tools of an agricultural implement. The system includes an agricultural implement having a frame and first and second ground-engaging tools supported relative to the frame, with the first ground-engaging tool corresponding to a different tool type than the second ground-engaging tool. The system also includes a first speed sensor configured to provide data indicative of a rotational speed of the first ground-engaging tool, and a second speed sensor configured to provide data indicative of a rotational speed of the second ground-engaging tool. In addition, the system includes a computing system communicatively coupled to the first and second speed sensors. The computing system is configured to monitor the rotational speeds of the first and second ground-engaging tools based on the data provided by the first and second speed sensors, determine a speed correlation between the rotational speed of the first ground-engaging tool and the rotational speed of the second ground-engaging tool, and determine when the speed correlation differs from a speed correlation threshold associated with the first and second ground-engaging tools.

In another aspect, the present subject matter is directed to an agricultural implement including a frame and a disk gang assembly supported relative to the frame, with the disk gang assembly including a plurality of harrow disks. The implement also includes a separate rotating ground-engaging tool supported relative to the frame, with the rotating ground-engaging tool corresponding to a different tool type than the plurality of harrow disks. In addition, the implement includes a first speed sensor configured to provide data indicative of a rotational speed of at least one harrow disk of the plurality of harrow disks, and a second speed sensor configured to provide data indicative of a rotational speed of the rotating ground-engaging tool. Moreover, the implement includes a computing system communicatively coupled to the first and second speed sensors. The computing system is configured to monitor the rotational speed of the at least one harrow disk based on the data provided by the first speed sensor, monitor the rotational speed of the rotating ground-engaging tool based on the data provided by the second speed sensor, determine a speed correlation between the rotational speed of the at least one harrow disk and the rotational speed of the rotating ground-engaging tool, and determine when the speed correlation differs from a speed correlation threshold associated with the at least one harrow disk and the rotating ground-engaging tool.

In a further aspect, the present subject matter is directed to method for detecting material accumulation relative to rotating ground-engaging tools of an agricultural implement. The agricultural implement includes a frame and first and second rotating ground-engaging tools supported relative to the frame, with the first ground-engaging tool corresponding to a different tool type than the second ground-engaging tool. The method includes monitoring, with a computing system, a rotational speed of both the first ground-engaging tool and the second ground-engaging tool, and determining, with the computing system, a speed correlation between the rotational speed of the first ground-engaging tool and the rotational speed of the second ground-engaging tool. Additionally, the method includes comparing, with the computing system, the speed correlation to a speed correlation threshold associated with the first and second ground-engaging tools, and initiating, with the computing system, a control action when it is determined that the speed correlation differs from the speed correlation threshold.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
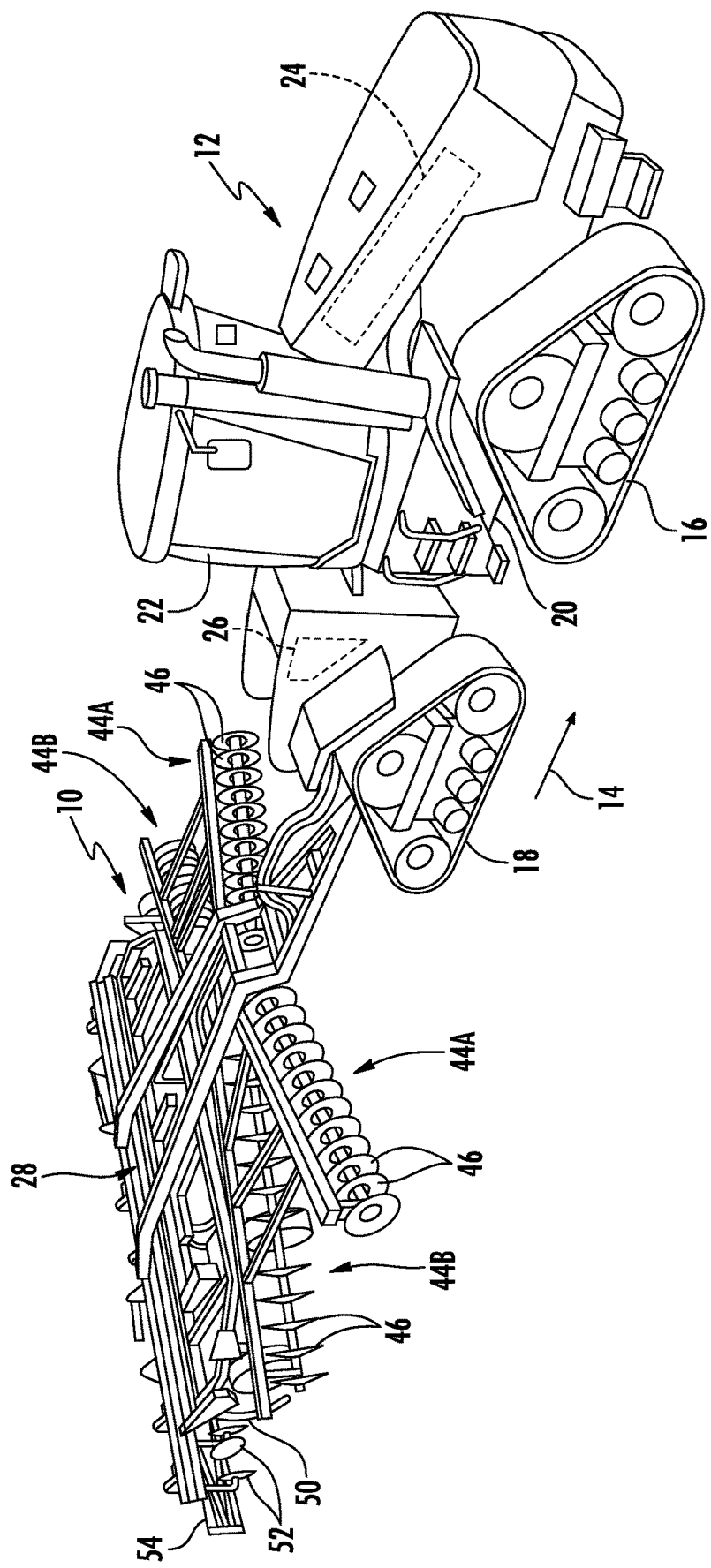
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting material accumulation relative to rotating ground-engaging tools of an agricultural implement. In several embodiments, a computing system may be configured to monitor the rotational speed of a first type of rotating ground-engaging tool relative to the rotational speed of a second type of rotating ground-engaging tool to determine or infer when one of such rotating ground-engaging tools is plugged or is otherwise experiencing plugging-related conditions. Specifically, the monitored rotational speed of the first type of rotating ground-engaging tool may then be compared to the monitored rotational speed of the second type of rotating ground-engaging tool to identify a speed correlation between such monitored rotational speeds (e.g., a speed differential or a speed ratio). The identified speed correlation may then be compared to a speed correlation threshold selected for such types of ground-engaging tools to infer tool plugging (e.g., a speed differential threshold or a speed ratio threshold). For instance, in one embodiment, when the identified speed correlation differs from the speed correlation threshold (e.g., by being greater than or less than the speed correlation threshold depending on the tool type being monitored for plugging and/or the type of threshold being used), the computing system may determine or infer tool plugging. Upon determining that the tool(s) is plugged, the computing system may be configured to automatically initiate a control action, such as by generating an operator notification and/or automatically adjusting the operation of the implement and/or the work vehicle that is towing the implement.

It should be appreciated that, by inferring tool plugging based on a comparison between the rotational speeds of different types of rotating ground-engaging tools, advantages may be obtained as compared to attempting to infer tool plugging based on a comparison between the rotational speeds of the same type of rotating ground-engaging tools. Specifically, when field conditions exists that are more likely to result in tool plugging, tools of the same type will typically begin to plug at the same rate or experience plugging in similar amounts. However, tools of different types will typically be impacted by such field conditions in different ways, thereby allowing tool plugging to be inferred by comparing the rotational speeds of such different tool types to one another.

Figure 2:
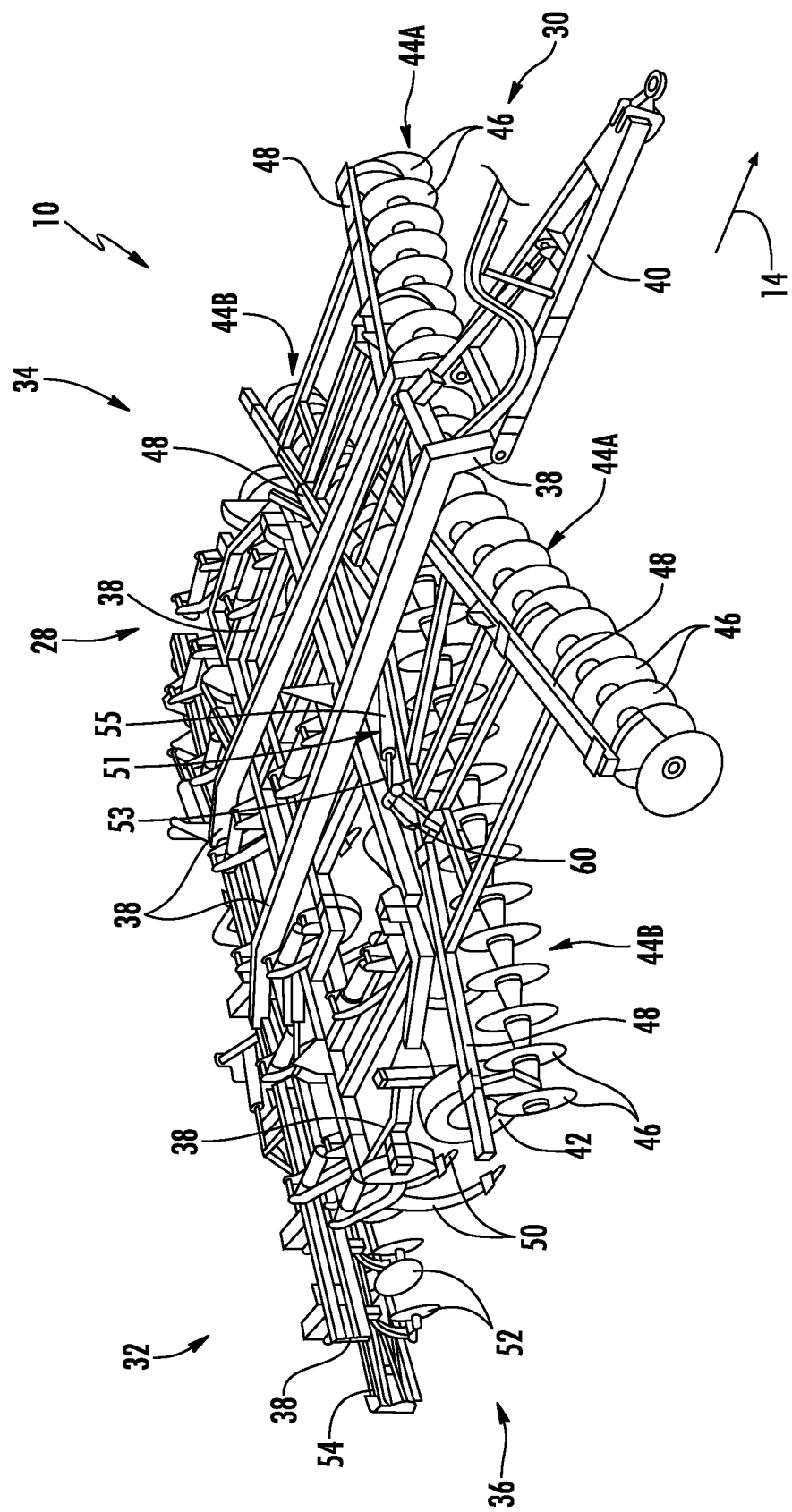
FIG. 2 illustrates another perspective view of the agricultural implement shown in FIG. 1 in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 23) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, the frame 28 may be configured to support various ground-engaging tools. For instance, the frame 28 may support one or more disk gang assemblies 44. As illustrated in FIG. 2, each disc gang assembly 44 includes a toolbar 48 coupled to the implement frame 28 and a plurality of harrow disks 46 supported by the toolbar 48 relative to the implement frame 28. Each harrow disk 46 may, in turn, be configured to penetrate into or otherwise engage the soil as the implement 10 is being pulled through the field. As is generally understood, the various disk gang assemblies 44 may be oriented at an angle relative to the direction of travel 14 to promote more effective tilling of the soil. In the embodiment shown in FIGS. 1 and 2, the implement 10 includes four disk gang assemblies 44 supported relative to the frame 28 at a location forward of the remainder of the ground-engaging tools. Specifically, the implement 10 includes a pair of front disk gang assemblies 44A and a pair of rear disc gang assemblies 44B positioned aft or rearward of the front disk gang assemblies 44A relative to the direction of travel 14 of the implement 10. However, it should be appreciated that, in alternative embodiments, the implement 10 may include any other suitable number of disk gang assemblies 44, such as more or less than four disk gang assemblies 44. Furthermore, in one embodiment, the disk gang assemblies 44 may be mounted to the frame 28 at any other suitable location, such as adjacent to its aft end 32.

Moreover, in several embodiments, the implement 10 may include a plurality of disk gang actuators 51 (one of which is shown in FIG. 2), with each actuator 51 being configured to move or otherwise adjust the orientation or position of one of the disk gang assemblies 44 relative to the implement frame 28. For example, as shown in FIG. 2, a first end of each actuator 51 (e.g., a rod 53 of the actuator 51) may be coupled to a toolbar 48 of the corresponding disk gang assembly 44, while a second end of each actuator 51 (e.g., the cylinder 55 of the actuator 51) may be coupled to the frame 28. The rod 53 of each actuator 51 may be configured to extend and/or retract relative to the corresponding cylinder 55 to adjust the penetration depth of the associated harrow disks 46. In the illustrated embodiment, each actuator 51 corresponds to a fluid-driven actuator, such as a hydraulic or pneumatic cylinder. However, it should be appreciated that each actuator 51 may correspond to any other suitable type of actuator, such as an electric linear actuator.

Additionally, as shown, in one embodiment, the implement frame 28 may be configured to support other ground-engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support one or more finishing tools, such as a plurality of leveler disks 52 and/or rolling (or crumbler) basket assemblies 54. However, in other embodiments, any other suitable ground-engaging tools may be coupled to and supported by the implement frame 28, such as a plurality of closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
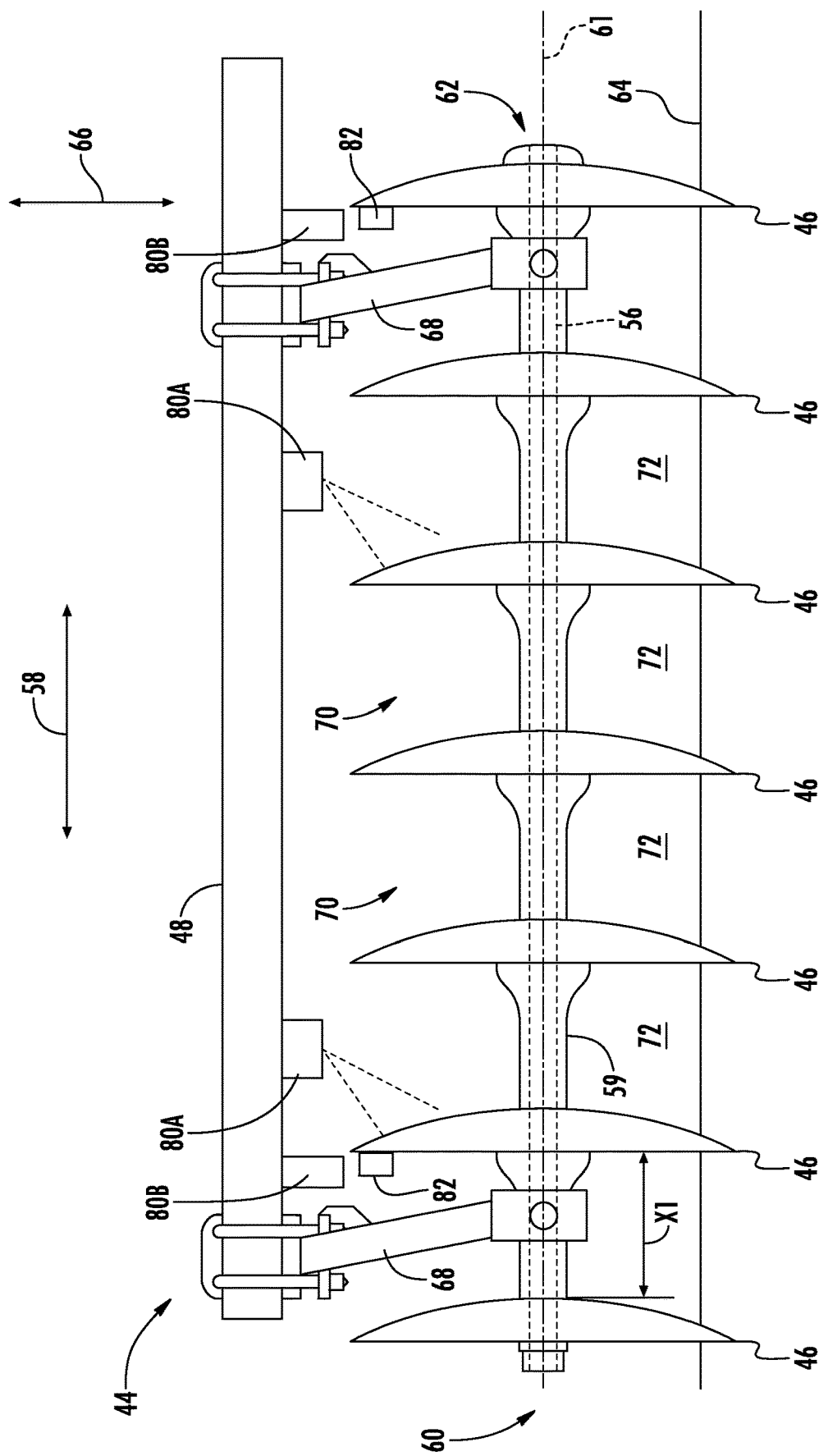
FIG. 3 illustrates a front view of one embodiment of a disk gang assembly of an agricultural implement in accordance with aspects of the present subject matter.
Figure 4:
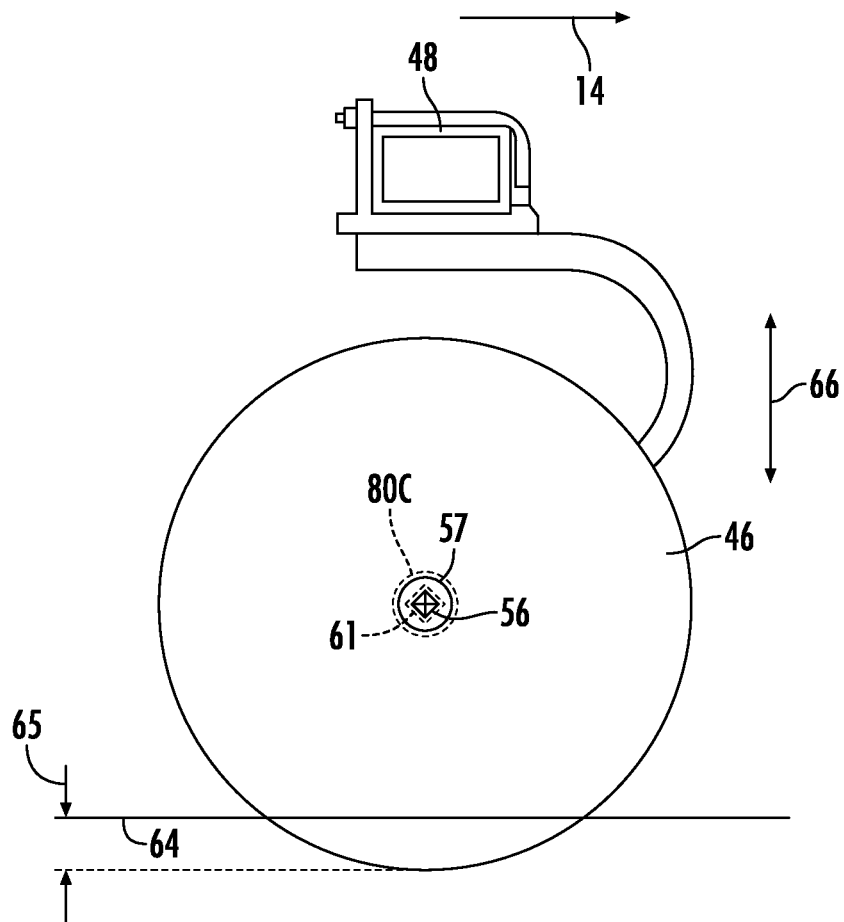
FIG. 4 illustrates an end view of the disk gang assembly shown in FIG. 3.

Referring now to FIGS. 3 and 4, exemplary views of a portion of the implement 10 shown in FIGS. 1 and 2 is illustrated in accordance with aspects of the present subject matter. More particularly, FIG. 3 illustrates a front view of one of the disk gang assemblies 44 described above with reference to FIGS. 1 and 2.

Additionally, FIG. 4 illustrates an end view of the disk gang assembly 44 shown in FIG. 3.

As shown in FIG. 3, the disk gang assembly 44 may include a disk gang shaft (e.g., as indicated with dashed lines 56) that extends along an axial direction of the disk gang assembly 44 (e.g., as indicated by arrow 58) between a first end 60 and a second end 62. The disk gang shaft 56 may be positioned below the toolbar 48 of the disk gang assembly 44 along a vertical direction (e.g., as indicated by arrow 66) of the implement 10 and supported relative to the toolbar 48 by one or more hangers 68. However, in alternative embodiments, the disk gang shaft 56 may have any other suitable orientation. Each harrow disk 46 may be rotatably coupled or keyed to the disk gang shaft 56 by a bearing 57 (FIG. 4). However, in some embodiments, the harrow disks 46 may be directly coupled to the disk gang shaft 56. The disk gang shaft 56 defines a rotational axis (e.g., as indicated by dashed line 61) about which the coupled harrow disks 46 rotate. Each harrow disk 46 may be spaced apart from an adjacent harrow disk 46 in the axial direction 58 via spools 59 by a distance Xl. An open space 70 is thus defined between each pair of adjacent harrow disks 46 in the axial direction 58.

As the implement 10 is moved across a field, the harrow disks 46 may be configured to penetrate the soil surface (e.g., as indicated by line 64) of the field to a given penetration depth 65 (FIG. 4) and rotate about the rotational axis relative to the soil such that field materials flow through the open spaces 70. It should be appreciated that during normal, non-plugged operation of the disk gang assembly 44, substantially all of the field materials being processed by the disk gang assembly 44 flow through the open spaces 70, particularly through portion(s) of open spaces 70 defined below the rotational axis 61 (i.e., through lower flow zone(s) 72), with only an occasional piece of residue, dirt clod, rock, and/or the like flowing above the disk gang shaft 56.

In certain instances, however, a plugged condition or state may occur in which field materials accumulate within the flow zone(s) 72. For example, when the soil in the field has high moisture content, the soil may stick or adhere to the harrow disks 46 such that the soil accumulates within the associated flow zone(s) 72. Moreover, a large chunk of residue or a rock may become lodged between a pair of adjacent harrow disks 46 in a manner that inhibits the flow of field materials through the associated flow zone(s) 72, thereby causing additional field materials to accumulate therein. As such, the harrow disks 46 may become plugged and not perform as intended. Such plugging typically results in the rotational speed of the harrow disks 46 being reduced. For instance, as materials accumulate relative to the harrow disks 46, the rotational resistance or friction applied by such materials may result in the rotation of the blades 46 being slowed or even stopped. Slowing or stopping of the rotation of the harrow disks 46 typically prevents the blades 46 from properly working the soil and can lead to undesirable tillage results (e.g., a lack of breaking-up of the soil or the generation of undesirable surface features, such as ridges or furrows).

In several embodiments, the rotational speed of the harrow disks 46 may be monitored using one or more tool speed sensors 80 provided in operative association with the disk gang assembly 44. In general, the tool speed sensor(s) 80 may correspond to any suitable sensing device or system configured to provide or generate data indicative of the rotational speed of one or more of the harrow disks 46 of the disk gang assembly 44. Various different examples of tool speed sensors 80 that can be used to monitor the rotational speed of the harrow disks 46 are shown in FIGS. 3 and 4. For instance, as shown in FIG. 3, in one embodiment, one or more optical speed sensors 80A (e.g., cameras) may be supported relative to the harrow disks 46 (e.g., by mounting the sensor(s) 80A to the toolbar 48) to detect the rotational speed of one or more harrow disks. In another embodiment, as shown in FIG. 3, a magnetic sensor 80A may be coupled to a non-rotating portion of the disk gang assembly 44 so that it can detect the presence of a magnet 82 provided in association with a corresponding harrow disk 46. In such an embodiment, by detecting the frequency at which the magnet 82 passes by the magnetic sensor 80B, the rotational speed of the harrow disk 46 can be determined. In yet another embodiment, a rotational speed sensor 80C (FIG. 4) (e.g., an inductive, capacitive, or optical sensor) may be provided in association with each bearing 57 of the disk gang assembly 44. As such, by monitoring the rotational speed of a component of the bearing 57 or a portion of the harrow disk 46 at the bearing/blade interface, the rotational speed of the harrow disk 46 can be determined. In further embodiments, the tool speed sensor(s) 80 may correspond to any other suitable sensing device or system configured to provide an indication of the rotational speed of one or more of the harrow disks 46 of the disk gang assembly 44.

In accordance with aspects of the present subject matter, to determine or infer when the harrow disks 46 are experiencing (or beginning to experience) a plugged condition or state, the rotational speed of the harrow disks 46 (as detected via the tool speed sensor(s) 80) may be compared to the rotational speed of a different type of rotating ground-engaging tool of the implement 10. For instance, as will be described below with reference to FIG. 5, tool speed sensors 80 may also be provided in operative association with one or more other types of rotating ground-engaging tools of the implement, such as one or more of the finishing tools (e.g., one or more of the basket assemblies 54 and/or leveler disks 52). In such embodiments, by comparing the rotational speed of the harrow disks 46 to the rotational speed of a different type(s) of rotating ground-engaging tool, a speed correlation between the tools can be determined (e.g., a speed differential or speed ratio), which can then be compared to an associated speed correlation threshold selected so as to correspond to an expected or anticipated speed correlation (e.g., an expected or anticipated speed differential or ratio) between the rotational speeds of the two different types of tools. As such, when the rotational speed of the harrow disks 46 has slowed sufficiently so that the speed correlation differs from the speed correlation threshold (e.g., a calculated speed differential is greater than a corresponding speed differential threshold), it may be inferred that the blades 46 are plugged or are otherwise experiencing plugging-related conditions.

Figure 5:
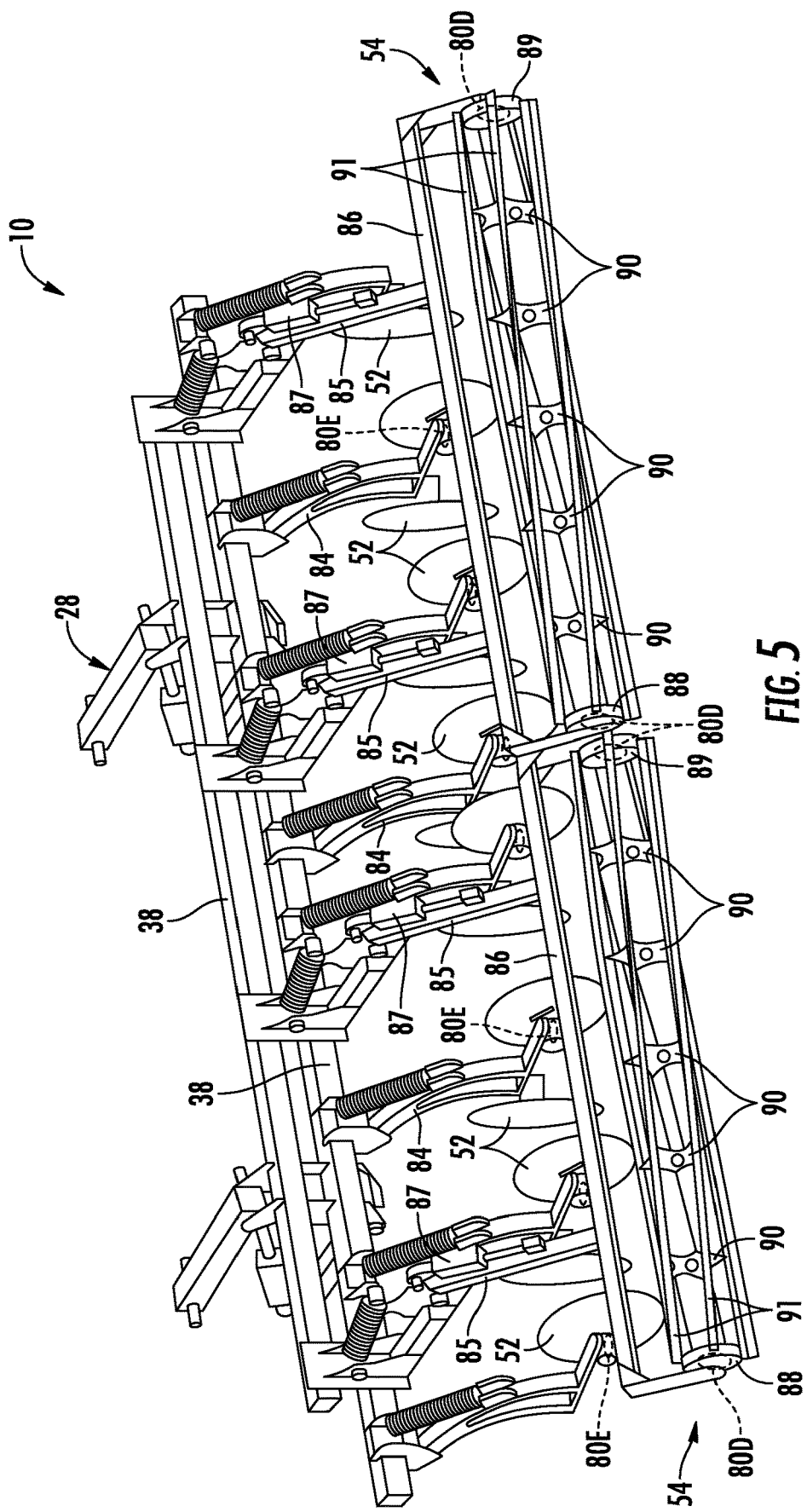
FIG. 5 illustrates a partial, perspective view of an aft end of an agricultural implement in accordance with aspects of the present subject matter, particularly illustrating a portion of the finishing tools of the implement.

Referring now to FIG. 5, a partial, perspective view of the aft end of the implement 10 shown in FIGS. 1 and 2 is illustrated in accordance with aspects of the present subject matter, particularly illustrating a portion of the finishing tools 52, 54 of the implement 10. As shown, the various finishing tools 52, 54 may be coupled to or supported by the implement frame 28, such as by coupling each tool to a toolbar or laterally extending frame member 38 of the frame 28. For instance, as shown in FIG. 5, a blade support arm 84 may be coupled between a given frame member 38 and each leveler disk 52 or set of leveler disks 52 to support the disks 52 relative to the frame 28. Similarly, one or more basket support arms 85 may be coupled between a given frame member 38 and an associated mounting yoke or basket hanger 86 for supporting each basket assembly 54 relative to the frame 28. Additionally, as shown in FIG. 5, in one embodiment, a basket actuator 87 (e.g., a hydraulic or pneumatic cylinder) may be coupled to each basket support arm 85 to allow the down force or down pressure applied to each basket assembly 54 to be adjusted. The basket actuators 87 may also allow the basket assemblies 54 to be raised off the ground, such as when the implement 10 is making a headland turn and/or when the implement 10 is being operated within its transport mode.

In several embodiments, each basket assembly 54 includes a plurality of support plates 88, 89, 90 configured to support a plurality of blades or bars 91 spaced circumferentially about the outer perimeter of the basket. For instance, as shown in FIG. 5, each basket assembly 54 includes first and second end plates 88, 89 positioned at the opposed lateral ends of the basket assembly 54 and a plurality of inner support plates 90 spaced apart laterally from one another between the end plates 88, 89. As is generally understood, the end plates 88, 89 may be rotatably coupled to the corresponding basket hanger 86 (which, in turn, is coupled to the associated bracket support arm(s) 85) via bearings to allow the basket assembly 54 to rotate relative to the hanger/arm 86, 85 as implement 10 is being moved across the field. Additionally, in the illustrated embodiment, the bars 91 of each basket assembly 54 are configured as formed bars. However, in other embodiments, the bars 91 may have any other suitable configuration, such as flat bars, round bars, and/or the like.

In several embodiments, the rotational speed of the finishing tools 52, 54 may be monitored using one or more tool speed sensors 80 provided in operative association with such tools. In general, the tool speed sensor(s) 80 may correspond to any suitable sensing device or system configured to provide or generate data indicative of the rotational speed of tool with which it is associated. Examples tool speed sensors 80 that can be used to monitor the rotational speed of the basket assemblies 54 and/or the leveler disks 52 are shown in FIG. 5. For instance, as shown in FIG. 5, in one embodiment, rotational speed sensors 80D (e.g., an inductive, capacitive, or optical sensor) may be provided in association with the bearings used to couple each basket assembly 54 to its respective basket hanger 86. As such, by monitoring the rotational speed of a component of the bearing or the relative speeds of components of the bearing (or the relative speed between the bearing and the basket), the rotational speed of the basket assembly 54 can be determined. Similarly, as shown in FIG. 5, rotational speed sensors 80E provided in association with the bearings rotationally supporting each leveler disk 52 relative to its respective blade support arm 84. In further embodiments, the tool speed sensor(s) 80 may correspond to any other suitable sensing device or system configured to provide an indication of the rotational speed of one or more of the basket assemblies 54 and/or leveler disks 52.

As indicated above, in accordance with aspects of the present subject matter, the rotational speed of the basket assemblies 54 and/or leveler disks 52 may be used as a reference rotational speed for determining or inferring when the harrow disks 46 of one or more of the disk gang assemblies 44 are plugged or are otherwise experiencing plugging-related conditions (e.g., due to the speed correlation between the reference rotational speed and the rotational speed of the harrow disks 46 being greater than or less than, as the case may be, an associated speed correlation threshold set for the tools). However, in other embodiments, it may be desirable, instead, to determine or infer when the basket assemblies 54 and/or leveler disks 52 are plugged or are otherwise experiencing plugging-related conditions. In such embodiments, the rotational speed of the blade disks 46 and/or any other suitable rotating ground-engaging tool may be used as a reference rotational speed for comparison with the rotational speed of the basket assemblies 54 and/or leveler disks 52. For instance, as will be described below, the disclosed system may generally be configured to compare the rotational speeds of two different types of ground-engaging tools to determine when one of such tool types is plugged or is otherwise experiencing plugging-related conditions.

Figure 6:
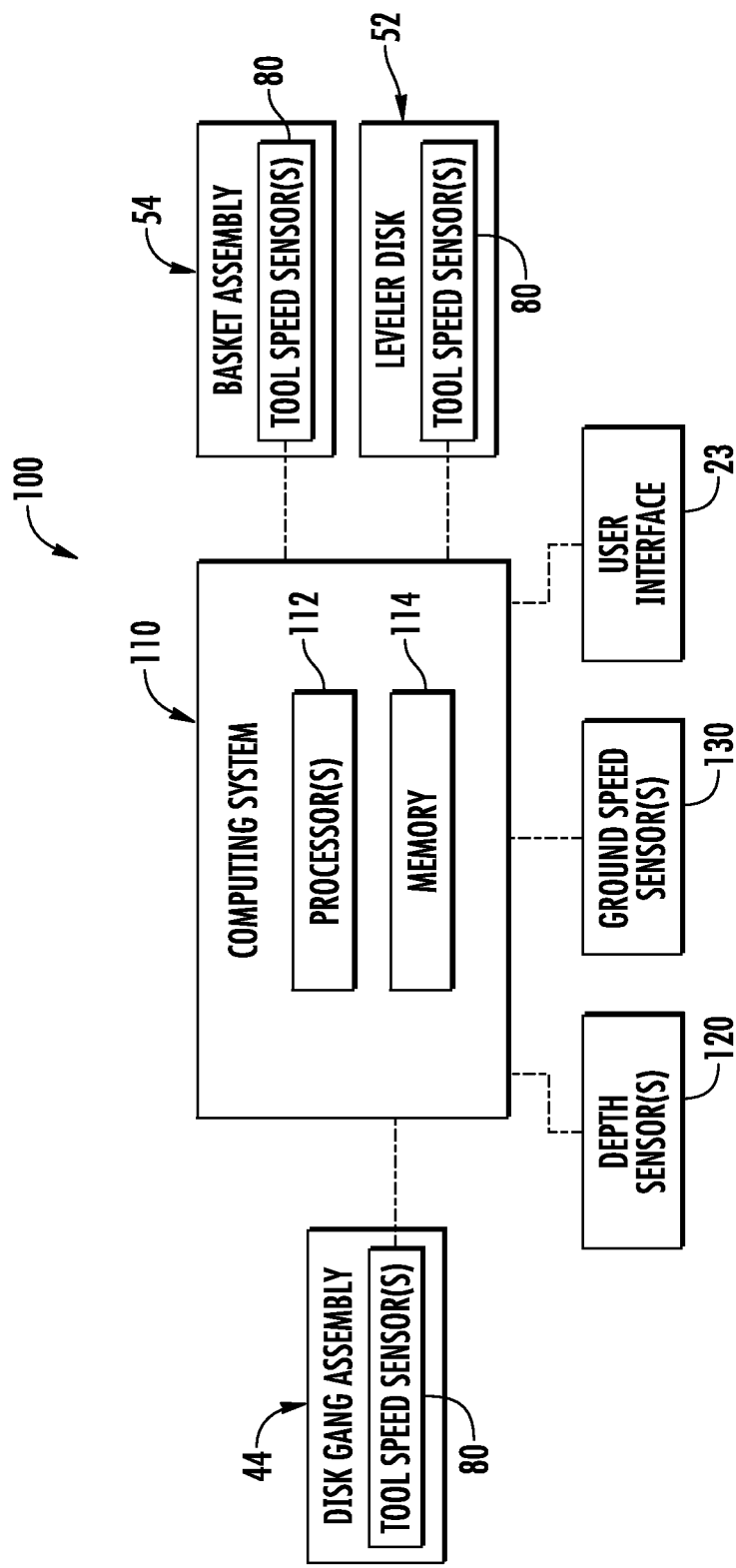
FIG. 6 illustrates a schematic view of one embodiment of a system for detecting material accumulation relative to rotating ground-engaging tools of an agricultural implement in accordance with aspects of the present subject matter.

Referring now to FIG. 6, a schematic view of one embodiment of a system 100 for detecting material accumulation relative to rotating ground-engaging tools of an agricultural implement is illustrated in accordance with aspects of the present subject matter. In general, the system 100 will be described herein with reference to the implement 10 and related rotating ground-engaging tools described above with reference to FIGS. 1-5. However, it should be appreciated by those of ordinary skill in the art that the disclosed system 100 may generally be utilized with agricultural implements having any other suitable implement configuration as well as rotating ground-engaging tools having any other suitable tool configuration. Additionally, even though the system 100 will generally be described herein with reference to the detection of material accumulation relative to one or more disk gang assemblies, basket assemblies, and/or leveler disks, it should be appreciated the present disclosure is generally applicable to any rotating ground-engaging tools, including individually mounted harrow disks, closing disks, and/or any other rotating tools of an agricultural implement.

In general, the system 100 may include one or more components of an agricultural implement, such as one or more of the components of the implement 10 described above. For example, as shown in FIG. 6, the system 100 may include one or more rotating ground-engaging tools, such as one or more disk gang assemblies 44, one or more basket assemblies 54, and/or one or more leveler disks 52. In one embodiment, each rotating ground-engaging tool may generally be provided in operative association with one or more tool speed sensors (e.g., the tool speed sensors 80 described above) configured to provide data indicative of the rotational speed of such tool. With reference to the disk gang assemblies 44, depending on the number and configuration of the tool speed sensors 80 being utilized, the sensors 80 may be configured to provide data indicative of the rotational speed of each individual harrow disk 46 of a given disk gang assembly 44 or data indicative of the rotational speed of one or more selected harrow disks 46 of a given disk gang assembly 44. When the rotational speed of only a select number of harrow disks 46 is being monitored, the detected speed(s) may be used to infer or calculate a rotational speed of the remaining harrow disks 46 of the associated disk gang assembly 44 (e.g., by inferring that the remaining blades 46 are rotating at the same speed (or average speed) of the monitored blades 46).

In accordance with aspects of the present subject matter, the system 100 may also include a computing system 110 configured to execute various computer-implemented functions. In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the methods or algorithms described herein. In addition, the computing system 110 may also include various other suitable components, such as a communications circuit or module, one or more input/output channels, a data/control bus and/or the like.

It should be appreciated that the computing system 110 may correspond to an existing computing system of the implement 10 or associated work vehicle 12 or the computing system 110 may correspond to a separate computing system. For instance, in one embodiment, the computing system 110 may form all or part of a separate plug-in module that may be installed in association with the implement 10 or work vehicle 12 to allow for the disclosed system 100 and related methods to be implemented without requiring additional software to be uploaded onto existing computing systems of the implement 10 and/or the work vehicle 12.

In several embodiments, the computing system 110 may be configured to monitor the rotational speed of a first type of rotating ground-engaging tool relative to the rotational speed of a second type of rotating ground-engaging tool to determine or infer when one of such rotating ground-engaging tools is plugged or is otherwise experiencing plugging-related conditions. Specifically, in one embodiment, the computing system 110 may be communicatively coupled to the various tool speed sensor 80 provided in association with the rotating ground-engaging tools of the implement 10 (e.g., via a wired or wireless connection) to allow the rotational speed of such tools to be monitored. The monitored rotational speed of one type of rotating ground-engaging tool (e.g., the harrow disks 46) may then be compared to the monitored rotational speed of a different type of rotating ground-engaging tool (e.g., the basket assemblies 54 and/or the leveler disks 52) to identify a speed correlation between such monitored rotational speeds. The identified speed correlation may then be compared to a speed correlation threshold selected for such types of ground-engaging tools to infer tool plugging. For instance, in one embodiment, the speed correlation may correspond to a speed differential between monitored rotational speeds. In such an embodiment, when the identified speed differential differs from an associated speed differential threshold (e.g., by being greater than or less than the speed differential threshold depending on the tool type being monitored for plugging), the computing system 100 may determine or infer tool plugging. In another embodiment, the speed correlation may correspond to a speed ratio between monitored rotational speeds. In such an embodiment, when the identified speed ratio differs from an associated speed ratio threshold (e.g., by being greater than or less than the speed ratio threshold depending on the tool type being monitored for plugging and/or which rotational speeds are being used for the numerator/denominator for the ratio), the computing system 100 may determine or infer tool plugging.

It should be appreciated that, as used herein, a rotating ground-engaging tool is considered to be a different type of tool from another rotating ground-engaging tool if the tool is generally configured to perform a different ground-engaging function than the other tool during the performance of an agricultural operation within a field. For instance, harrow disks 46 of a disk gang assembly 44 generally correspond to different tool types than leveler disks 52 and basket assemblies 54, as the harrow disks 46 are configured to perform a different ground-engaging function than such other tools. Similarly, although both are considered "finishing tools", basket assemblies 54 generally correspond to different tool types than leveler disks 52, as the basket assemblies 54 are configured to perform a different ground-engaging function than the leveler disks 52 and vice versa. Additionally, in an instance in which a rotating ground-engaging tool is installed on the implement solely to provide a reference rotational speed value for inferring tool plugging, such single-purpose tool would be considered to be a different type of tool than the other rotating tools of the implement since the tool would be configured to perform a different ground-engaging function that the other tools (e.g., ground engagement solely for the purpose of rotationally driving the tool versus ground engagement to work the soil).

It should also be appreciated that the speed correlation threshold used to determine or infer plugging may vary depending on the different tool types being used to calculate the speed correlation (e.g., via the rotational speeds of such tools). For instance, during normal, non-plugged conditions, a greater speed differential may generally be anticipated or expected to exist between the rotational speed of the harrow disks 46 and the rotational speeds of the finishing tools 52, 54 than the speed differential existing between the finishing tools 52, 54 themselves due to the harrow disks 46 being generally subject to greater amounts of slippage. Thus, a larger speed differential threshold may be applied when attempting to compare the rotational speed of the harrow disks 46 to the rotational speed of one or more of the finishing tools 52, 54 to infer plugging at a given speed. Similarly, a speed ratio threshold may be applied when attempting to compare the rotational speed of the harrow disks 46 to the rotational speed of one or more of the finishing tools 52, 54 to infer plugging at a given speed Additionally, even amongst the same two tool types, the speed correlation threshold may also vary based on one or more operating conditions and/or parameters. For instance, as will be described below, it may be desirable to vary the speed correlation threshold as a function of both the penetration depth of the harrow disks 46 and the ground speed of the implement 10 to accommodate variations in the anticipated amount of disk slippage occurring with changes in the depth/speed. Moreover, in addition to the penetration depth and ground speed, tool slippage may also be affected by one or more field-related operating conditions, such as the crop type previously planted within the field, the percent soil moisture, the soil type, and/or the like.

As indicated above, the computing system 110 may be configured to determine or infer tool plugging by comparing the speed correlation between the rotational speed of a first type of rotating ground-engaging tool and the rotational speed of a second type of rotating ground-engaging tool to an associated speed correlation threshold. Moreover, when it is determined that a given rotating ground-engaging tool is plugged or otherwise in a plugged state (e.g., a partially or fully plugged state), the computing system 110 may be further configured to automatically initiate one or more control actions. For example, the computing system 110 may be configured to provide the operator with a notification that one or more tools are in a plugged state. Specifically, in one embodiment, the computing system 110 may be communicatively coupled to the user interface 23 of the work vehicle 12 via a wired or wireless connection to allow notification signals to be transmitted from the computing system 100 to the user interface 23. In such an embodiment, the notification signals may cause the user interface 23 to present a notification to the operator (e.g., by causing a visual or audible notification or indicator to be presented to the operator) which provides an indication that one or more tools are in a plugged state. In such instance, the operator may then choose to initiate any suitable corrective action he/she believes is necessary, such as adjusting the penetration depth or downforce associated with the plugged tool and/or adjusting the ground speed of the implement 10.

Additionally, in several embodiments, the control action(s) executed by the computing system 110 may include automatically adjusting the operation of the implement 10 and/or the associated work vehicle 12. For instance, in one embodiment, the computing system 110 may be configured to automatically adjust the penetration depth and/or downforce associated with the plugged tool. In another embodiment, the computing system 110 may be configured to automatically adjust the ground speed of the implement 10 to address plugging-related conditions, such as by actively controlling the engine 24 and/or the transmission 26 of the work vehicle 12.

As an example of the present subject matter, to determine or infer plugging of one or more of the harrow disks 46, the rotational speed of such harrow disks 46 may be compared to the rotational speed of another rotating ground-engaging tool (e.g., the basket assemblies 54 or the leveler disks 52) to identify a speed differential between such monitored rotational speeds. The identified speed differential may then be compared to a speed differential threshold selected for such tools. For instance, it may be anticipated or expected that the rotational speed of the harrow disks 46 will generally differ from the rotational speed of the other rotating ground-engaging tool by a given amount during normal, non-plugged operation. This anticipated or expected speed differential may then be applied as the speed differential threshold (including any suitable margin or tolerance range, such as +/−5% or 10%) to determine or infer that the harrow disks 46 are plugged. Specifically, when the speed differential between the harrow disks 46 and the other rotating ground-engaging tool increases above the predetermined differential threshold, the computing system 100 may determine or infer that the harrow disks 54 of a given disk gang assembly 44 are plugged.

As indicated above, the speed correlation threshold applied between two different tool types may be varied based on one or more monitored operating conditions and/or parameters, particularly when one of the tool types corresponds to harrow disks 46. For instance, in several embodiments, the computing system 110 may be configured to calculate or select an applicable differential threshold to be used for evaluating the speed differential between the rotational speed of the harrow disk(s) and the rotational speed of a different type of rotating ground-engaging tool based on the current penetration depth 65 of such harrow disk(s) 46 and the ground speed of the implement 10. Specifically, the present inventors have discovered that the amount or percentage of slip occurring on the harrow disks 46 generally varies as a function of penetration depth 65 of such blades 46 at a given ground speed. Accordingly, given the variation in the amount or percentage of slip as the penetration depth changes, the disclosed computing system 110 may be configured to similarly vary the differential threshold being used to determine the "plugging" status of the harrow disk(s) 46. For example, the computing system 110 may be configured to generally increase the differential value associated with the differential threshold when a higher amount or percentage of slip is anticipated. This higher differential threshold value allows the system 100 to accommodate greater amounts of slippage without providing false positives (i.e., inferring that the harrow disk(s) 46 are plugged when, in fact, the blades 46 are simply subject to increased slippage due to their current penetration depth). Additionally, when the speed correlation threshold correspond to a speed ratio threshold, a similar depth-dependent variation may also be made the ratio value applied for the threshold.

Figure 7:
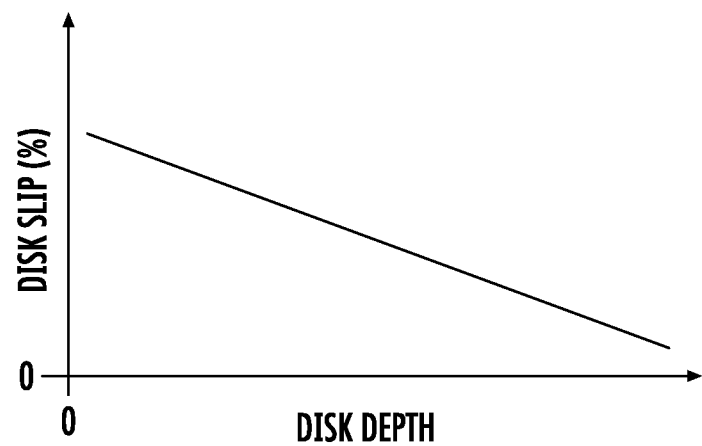
FIG. 7 illustrates a graph plotting an exemplary relationship between the penetration depth of harrow disks of an agricultural implement and the amount or percent slippage of such disks in accordance with aspects of the present subject matter.

For instance, FIG. 7 illustrates a graph plotting an exemplary relationship between the penetration depth of harrow disks (on the x-axis) and the amount or percent slippage of such blades (on the y-axis). As shown, an inverse relationship generally exists between the percent slippage and the penetration depth of the harrow disks. Specifically, the percent slippage of the harrow disks generally decreases with increases in the penetration depth. Thus, at shallower depths, the harrow disks are generally subject to increased slippage. Accordingly, to avoid false positives when determining or inferring the plugging-related status of the harrow disks, the speed correlation threshold may be varied as a function of the penetration depth at a given ground speed.

Additionally, it is generally expected that the rotational speed of the harrow disks 46 will increase (or decrease) with increases (or decreases) in the ground speed of the implement 10. However, with the amount of slip typically varying between the harrow disks 46 and other rotating ground-engaging tools, such increases (or decreases) in the rotational speed of the harrow disks 46 with increases (or decreases) in the ground speed of are not always one-to-one with the speed variations in the other ground-engaging tools Thus, in one embodiment, the value associated with the speed correlation threshold may also be varied with changes in the ground speed.

Referring back to FIG. 6, to select the applicable speed correlation threshold when the rotational speed of the harrow disks 46 is being used as an input to calculate the speed correlation, the computing system 110 may generally be configured to receive a depth input associated with the current penetration depth 65 of the harrow disks 46. In one embodiment, this input may be received from the operator. For instance, the operator may select or input the desired or current penetration depth 65 via the user interface 23 provided within the cab 22 of the work vehicle 12. Alternatively, the computing system 110 may be configured to actively monitor the current penetration depth 65 of the harrow disks 46 via sensor feedback provided by one or more depth sensors 120. For example, in one embodiment, each depth sensor(s) 120 may correspond to a pressure sensor or position sensor provided in operative association with a corresponding disk gang actuator(s) 51 of the implement 10. In such an embodiment, the sensor(s) may be configured to monitor the extent to which the actuator 51 has been extended/retracted, thereby allowing the computing system 110 to determine or infer the penetration depth 65 of the harrow disks 46 based on the extended/retracted state of the actuator 51. In another embodiment, each depth sensor (s) 120 may correspond to a position sensor (e.g., a rotary or linear potentiometer) configured to monitor the relative position between the toolbar 48 of the corresponding disk gang assembly 44 and the implement's main frame, 28 thereby allowing the computing system 110 to determine or infer the penetration depth 65 of the harrow disks 46 based on such position data. In even further embodiments, the computing system 110 may be communicatively coupled to any other suitable depth sensor(s) or feedback device(s) that allows the computing system 110 to directly or indirectly monitor/infer the penetration depth 65 of the harrow disks 46.

Additionally, as shown in FIG. 6, to allow the computing system 110 to monitor the ground speed of the implement 10, the computing system 110 may be communicatively coupled to one or more ground speed sensors 130. In general, the ground speed sensor(s) 130 may correspond to any suitable sensing device or system that is configured to provide data indicative of the ground speed of the implement 10. For instance, in one embodiment, the ground speed sensor 130 may correspond to a GPS device or any other suitable satellite navigation position system configured to generate data associated with the ground speed of the implement 10. In another embodiment, the ground speed sensor(s) 130 may correspond to a rotary speed sensor(s) configured to monitor the rotational speed of a given component that provides an indication of the ground speed of the implement 10, such as the engine 24 or transmission 26 of the work vehicle 12 or a wheel of the vehicle 12 or implement 10. In yet another embodiment, the ground speed sensor(s) 130 may correspond to a radar sensor aimed at the ground.

In several embodiments, to account for variations in the penetration depth and/or the ground speed, the computing system 110 may be configured to utilize one or more look-up tables and/or mathematical relationships to select an appropriate speed correlation threshold. For instance, in one embodiment, the computing system 110 may include a look-up table or mathematical relationship that correlates correlation values for the speed correlation threshold to the ground speed of the implement 10, thereby allowing the computing system 110 to select an initial threshold value based on the current ground speed of the implement 10. Such initial threshold value may then be adjusted or corrected (e.g., up or down), as necessary, based on the current penetration depth 65 of the harrow disks 46 (e.g., by scaling or adjusting the initial value based on a known relationship between the penetration depth 65 and the threshold values or disk slippage). In another embodiment, the computing system 110 may include a plurality of ground-speed-dependent look-up tables or mathematical relationships (e.g., one for each of a plurality of different ground speeds) that correlates threshold values for the speed correlation threshold to penetration depths of the harrow disks at each ground speed, thereby allowing the computing system 110 to select an appropriate threshold value as a function of the penetration depth and ground speed. In such an embodiment, the computing system 110 may be configured to use suitable interpolation techniques to calculate a threshold value when the current ground speed is between two reference ground speeds for which look-up tables and/or mathematical expressions are stored within the computing system's memory 114.

Figure 8:
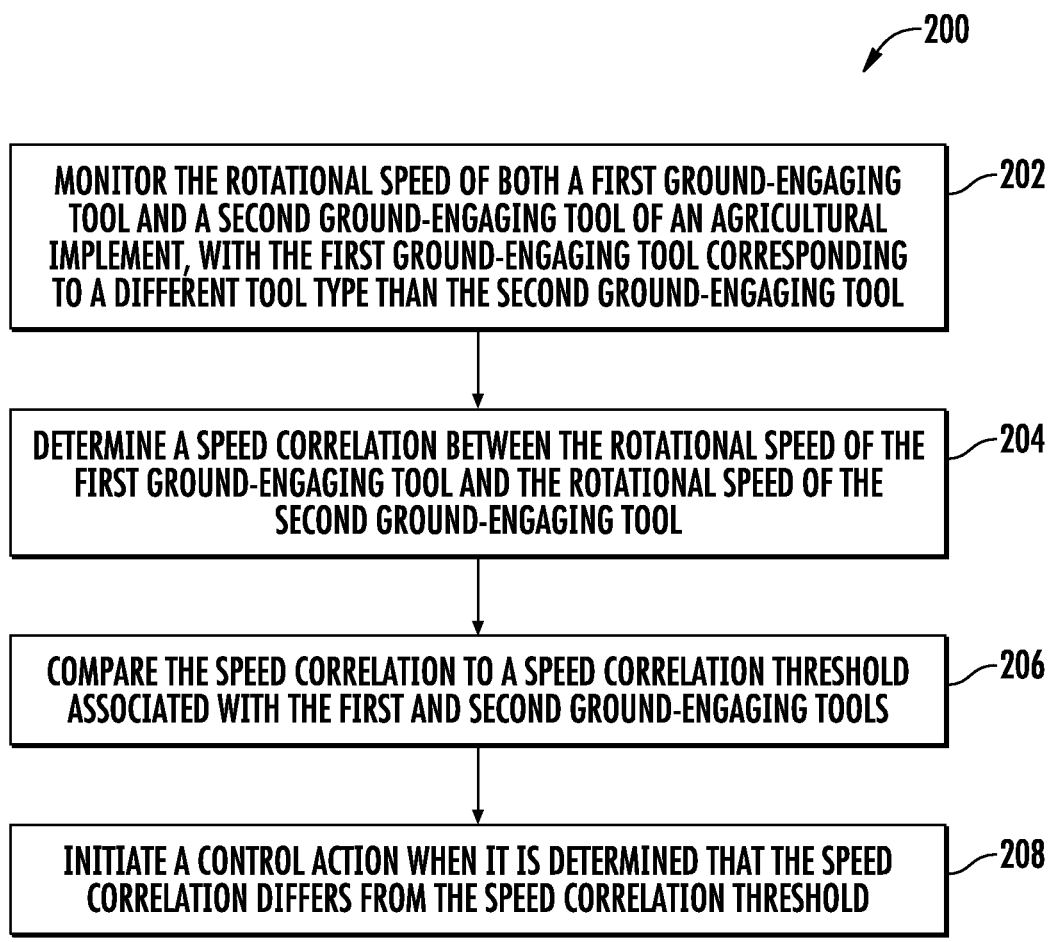
FIG. 8 illustrates a flow diagram of one embodiment of a method for detecting material accumulation relative to rotating ground-engaging tools of an agricultural implement in accordance with aspects of the present subject matter.

Referring now to FIG. 8, a flow diagram of one embodiment of a method 200 for detecting material accumulation relative to one or more rotating ground-engaging tools of an agricultural implement is illustrated in accordance with aspects of the present subject matter. In general, the method 200 will be described herein with reference to the agricultural implement, rotating ground-engaging tools, and the system described above with reference to FIGS. 1-6. However, it should be appreciated by those of ordinary skill in the art that the disclosed method 200 may generally be utilized in association with agricultural implements having any suitable implement configuration, rotating ground-engaging tools having any other suitable tool configuration (e.g., individually mounted harrow disks) and/or systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include monitoring the rotational speed of both a first ground ground-engaging tool and a second ground-engaging tool of an agricultural implement, with the first ground-engaging tool corresponding to a different tool type than the second ground-engaging tool. For instance, as indicated above, the computing system 110 may be configured to monitor the rotational speeds of different types of rotating tools via sensor feedback provided by associated tool speed sensors 80.

Additionally, at (204), the method 200 may include determining a speed correlation between the rotational speed of the first ground-engaging tool and the rotational speed of the second ground-engaging tool. Specifically, as indicated above, the computing system 110 may be configured to determine a speed correlation between the rotational speeds of the rotating tools being monitored, such as by subtracting the rotational speed of one type of rotating ground-engaging tool from the rotational speed of another type of ground-engaging tool to determine a speed differential between the rotational speeds or by dividing the rotational speed of one type of rotating ground-engaging tool by the rotational speed of another type of ground-engaging tool to determine a speed ratio between the rotational speeds.

Moreover, at (206) and (208), the method 200 may include comparing the speed correlation to a speed correlation threshold associated with the first and second ground-engaging tools, and initiating a control action when it is determined that the speed correlation differs from the speed correlation threshold. For example, as indicated above, the computing system 110 may be configured to compare the calculated speed correlation to the applicable speed correlation threshold selected for such tools (e.g., an applicable speed differential threshold or speed ratio threshold) to determine when the speed correlation differs from the correlation threshold. Upon making such a determination, the computing system 110 may be configured to automatically initiate a control action, such as be generating an operator notification and/or adjusting the operation of the implement 10 and/or associated work vehicle 12.

It is to be understood that the steps of the method 200 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the method 200, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting material accumulation relative to rotating ground-engaging tools of an agricultural implement, the system comprising:

an agricultural implement including a frame and first and second ground-engaging tools supported relative to the frame, the first and second ground-engaging tools being configured to engage a field to perform an agricultural operation, the first ground-engaging tool corresponding to a different tool type than the second ground-engaging tool;

a first speed sensor configured to provide data indicative of a rotational speed of the first ground-engaging tool;

a second speed sensor configured to provide data indicative of a rotational speed of the second ground-engaging tool; and a computing system communicatively coupled to the first and second speed sensors, the computing system being configured to:

monitor the rotational speeds of the first and second ground-engaging tools based on the data provided by the first and second speed sensors;

determine a speed correlation between the rotational speed of the first ground-engaging tool and the rotational speed of the second ground-engaging tool; and determine when the speed correlation differs from a speed correlation threshold associated with the first and second ground-engaging tools.

2. The system of claim 1, wherein the first ground-engaging tool comprises a harrow disk and the second ground-engaging tool comprises a rotating finishing tool.

3. The system of claim 2, wherein the rotating finishing tool comprises one of a basket assembly or a leveler disk.

4. The system of claim 1, wherein the computing system is further configured to vary the speed correlation threshold based on one or more monitored operating conditions or parameters.

5. The system of claim 4, wherein the first ground-engaging tool comprises a harrow disk and the computing system is configured to vary the speed correlation threshold as a function of a penetration depth of the harrow disk and a ground speed of the agricultural implement.

6. The system of claim 1, wherein either: (1) the speed correlation threshold comprises a speed differential threshold and the speed correlation comprises a speed differential between the rotational speeds of the first and second ground-engaging tools; or (2) the speed correlation threshold comprises a speed ratio threshold and the speed correlation comprises a speed ratio between the rotational speeds of the first and second ground-engaging tools.

7. The system of claim 1, wherein the computing system is further configured to automatically initiate a control action when it is determined that the speed correlation differs from the speed correlation threshold.

8. The system of claim 1, wherein the computing system is configured to determine that one of the first ground-engaging tool or the second ground-engaging tool is plugged when the speed correlation differs from the speed correlation threshold.

9. An agricultural implement, comprising:
a frame;
a disk gang assembly supported relative to the frame, the disk gang assembly including a plurality of harrow disks;
a separate rotating ground-engaging tool supported relative to the frame, the rotating ground-engaging tool corresponding to a different tool type than the plurality of harrow disks, the separate ground-engaging tool being configured to engage with a field to perform an agricultural operation;
a first speed sensor configured to provide data indicative of a rotational speed of at least one harrow disk of the plurality of harrow disks;
a second speed sensor configured to provide data indicative of a rotational speed of the rotating ground-engaging tool; and
a computing system communicatively coupled to the first and second speed sensors, the computing system being configured to:
monitor the rotational speed of the at least one harrow disk based on the data provided by the first speed sensor;
monitor the rotational speed of the rotating ground-engaging tool based on the data provided by the second speed sensor;
determine a speed correlation between the rotational speed of the at least one harrow disk and the rotational speed of the rotating ground-engaging tool; and
determine when the speed correlation differs from a speed correlation threshold associated with the at least one harrow disk and the rotating ground-engaging tool.

10. The agricultural implement of claim 9, wherein the rotating ground-engaging tool comprises a rotating finishing tool of the agricultural implement.

11. The agricultural implement of claim 10, wherein the rotating finishing tool comprises one of a basket assembly or a leveler disk.

12. The agricultural implement of claim 9, wherein the speed correlation threshold comprises a speed differential threshold, the computing system being configured to vary the differential threshold as a function of a penetration depth of the at least one harrow disk and a ground speed of the agricultural implement.

13. The agricultural implement of claim 9, wherein either: (1) the speed correlation threshold comprises a speed differential threshold and the speed correlation comprises a speed differential between the rotational speed of the at least one harrow disk and the rotational speed of the rotating ground-engaging tool; or (2) the speed correlation threshold comprises a speed ratio threshold and the speed correlation comprises a speed ratio between the rotational speed of the at least one harrow disk and the rotational speed of the rotating ground-engaging tool.

14. The agricultural implement of claim 9, wherein the computing system is further configured to automatically initiate a control action when it is determined that the speed correlation differs from the speed correlation threshold.

15. The agricultural implement of claim 9, wherein the computing system is configured to determine that the at least one harrow disk is plugged when the speed correlation differs from the speed correlation threshold.

16. A method for detecting material accumulation relative to rotating ground-engaging tools of an agricultural implement, the agricultural implement including a frame and first and second rotating ground-engaging tools supported relative to the frame, the first ground-engaging tool corresponding to a different tool type than the second ground-engaging tool, the method comprising:
monitoring, with a computing system, a rotational speed of both the first ground-engaging tool and the second ground-engaging tool as the first ground-engaging tool and the second-ground engaging tool are engaging a field to perform an agricultural operation;
determining, with the computing system, a speed correlation between the rotational speed of the first ground-engaging tool and the rotational speed of the second ground-engaging tool;
comparing, with the computing system, the speed correlation to a speed correlation threshold associated with the first and second ground-engaging tools; and
initiating, with the computing system, a control action when it is determined that the speed correlation differs from the speed correlation threshold.

17. The method of claim 16, further comprising varying the speed correlation threshold as a function of one or more monitored operating conditions or parameters.

18. The method of claim 17, wherein the speed correlation threshold comprises a speed differential threshold and the first ground-engaging tool comprises a harrow disk, wherein varying the speed differential threshold comprises varying the speed differential threshold as a function of a penetration depth of the harrow disk and a ground speed of the agricultural implement.

19. The method of claim 18, wherein varying the speed differential threshold comprises varying the speed differential threshold such that, at a given ground speed, the speed differential threshold is decreased with increases in the penetration depth and increased with decreases in the penetration depth.

20. The method of claim 16, wherein initiating the control actions comprises at least one of providing an operator notification to an operator of the agricultural implement or automatically adjusting the operation of the agricultural implement or a work vehicle configured to tow the agricultural implement.

* * * * *